United States Patent Office 2,821,471
Patented Jan. 28, 1958

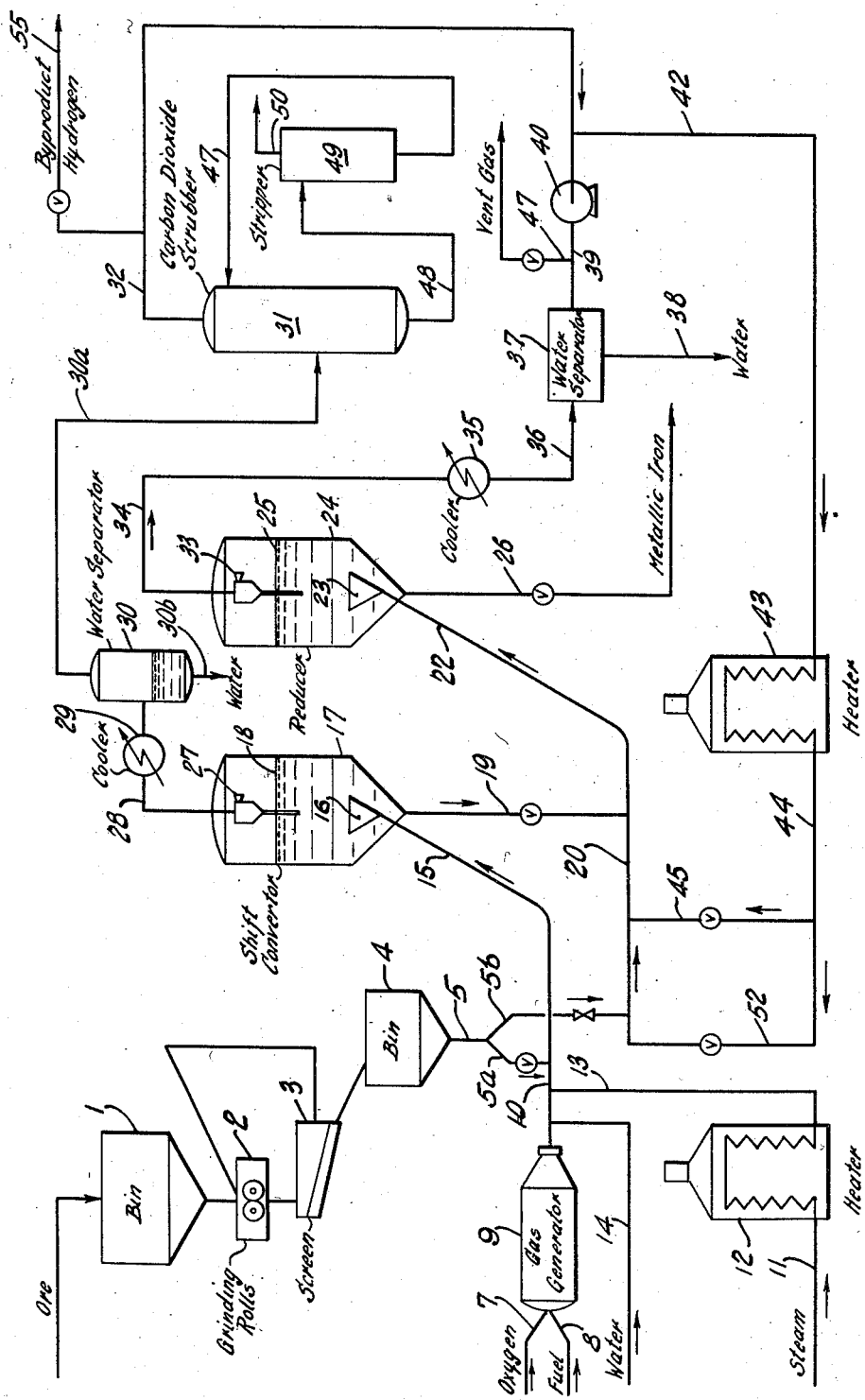

2,821,471

PROCESS FOR REDUCTION OF IRON ORE

Frederick Burton Sellers, Tarrytown, N. Y., assignor to Texaco Development Corporation, New York, N. Y., a corporation of Delaware Application December 19, 1956, Serial No. 629,255

9 Claims. (Cl. 75—26)

This invention relates to a method for the reduction of iron ore. More particularly, it is directed to a process for the reduction of iron ore in the presence of hydrogen produced by the water gas shift conversion of carbon monoxide-containing gases. Advantageously, carbon monoxide-containing gases are generated by the partial combustion of a carbonaceous fuel. In the process of this invention, at least a part of the raw ore to be reduced is passed first to a water gas shift conversion step to provide catalyst therein and is thereafter passed to a hydrogen reduction step.

The great bulk of iron ore reduction is effected in the well-known blast furnace operation wherein carbon and carbon monoxide are employed as reducing agents at elevated temperatures. Blast furnace operation is limited to the use of high quality coke in order to provide the necessary structural strength to support the weight of ore, coke, and limestone in the blast furnace charge and to provide passageways within the mass for the reducing gases and molten iron and slag. Additionally blast furnace operation is restricted to the use of limited high quality ores which are available in lump form of high strength and iron content. For example, ores such as taconite are unsuitable as mined and must be processed to reduce the high silica content, and the fine particles of beneficiated taconite must be formed into hard balls before inclusion in blast furnace feed.

The Soderfors process has been developed on a limited scale as permitted by the availability of cheap electric power. The Soderfors process effects reduction of iron ore at a temperature of about 1800° F. with a carbon monoxide-rich gas which is normally produced by the reaction of carbon dioxide-containing off-gas with an electrically heated bed of coke. The Soderfors process, like the blast furnace, is not adapted to the reduction of iron ore fines because of the necessity of the ore supporting itself in the shaft-like vertical vessel employed therein. The disadvantages of the Soderfors process are as follows: First, high quality ore is required; second, the output is low because of the slow rate of reduction; and third, use of electrical heating in the production of reducing gas necessitates the availability of cheap electric power.

The continuous reduction of iron ore to metallic iron with hydrogen in a fluid bed has now been developed and is described in detail in the co-pending application of Du Bois Eastman, Serial No. 379,861 filed September 14, 1953. Typically, in the fluidized reduction of iron ore, the ore is sized into particles suitable for fluidization, and is contacted in a fluidized bed with a hydrogen-containing gas at a temperature between about 700 and 1600° F. at a pressure between 50 and 650 p. s. i. g. or higher. It will be realized that suitable operating conditions will vary depending upon the characteristics of the ore employed.

Many methods have been developed for the generation of hydrogen including the water-gas process, steam-hydrocarbon reforming, and the partial combustion of carbonaceous fuels. In these processes, mixtures comprising carbon monoxide and hydrogen are produced which are subjected to the water-gas shift reaction wherein the carbon monoxide is reacted with steam to produce additional hydrogen and carbon dioxide. The carbon dioxide may then be removed, for example, by absorption in monoethanolamine, to provide a gas of high hydrogen concentration. The combined process of water gas shift conversion and hydrogen ore reduction described herein may employ carbon monoxide-containing gases produced by other means as well as those referred to above. However, the combined process of this invention is particularly well adapted for the use of carbon monoxide-hydrogen mixtures produced by the partial combustion of carbonaceous fuels with oxygen.

In the well-known water-gas shift conversion process, carbon monoxide is reacted with steam at a temperature between about 600° F. and 1000° F. at a pressure from atmospheric to about 650 p. s. i. g. in the presence of an iron oxide catalyst. The catalyst is usually prepared from highly purified iron oxide with lesser quantities of the oxides of magnesium, potassium, sodium, aluminum and chromium to produce a catalyst of long life, sustained activity, and high strength. In the process of my invention, iron ore is employed in place of the expensive conventional catalysts. Since the iron ore can be added and withdrawn continuously or as necessary, the maintenance of catalyst activity over a long period is unimportant. Similarly, materials which would otherwise tend to poison the catalyst are continuously removed with the ore. Crushing strength of the ore is unimportant when the ore is employed in a fluidized bed.

In the process of this invention, it is preferred to generate a mixture of carbon monoxide and hydrogen by the partial combustion of carbonaceous or hydrocarbon fuels, for example coal, fuel oil or gaseous hydrocarbons. In this operation, the fuel is reacted with an oxygen-containing gas, preferably oxygen. Commercially pure oxygen is readily obtained by the rectification of air. Liquid hydrocarbons and solid fuels are ordinarily gasified with added steam to control the temperature within the desired range. The steam further serves to generate hydrogen in the reaction. The generation of carbon monoxide and hydrogen by this process is carried out at a temperature within the range of about 1800° F. to about 3200° F. preferably within the range of 2200 to 2800° F. In general, from about one-half to about three volumes of hydrogen are generated for each volume of carbon monoxide produced.

The crude hydrogen and carbon monoxide-containing gas from the partial oxidation zone is passed with steam to a water-gas shift reactor containing a catalyst consisting of iron ore particles. The temperature of the water-gas shift conversion zone is maintained within the range of about 600 to 1000° F. Advantageously, the iron ore particles are maintained in a fluidized bed in the shift reactor and ore is continuously added and withdrawn to maintain high catalytic activity. Between about 90 and 95% of the carbon monoxide in the inlet gas stream is reacted with the steam to produce carbon dioxide and additional hydrogen according to the following equation:

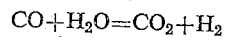

$$CO + H_2O = CO_2 + H_2$$

Effluent from the water gas shift reaction is scrubbed with a solvent to remove carbon dioxide. The resultant gas stream comprising hydrogen and preferably containing at least 90% hydrogen is supplied to the recycle system of the ore reducer as make-up for the hydrogen consumed in the reduction.

The reduction step of the process of this invention is effected in a fluid bed operation to maintain isothermal conditions in the reaction bed thereby facilitating introduction of the required endothermic seat of reaction. The reduction is effected at a temperature within the range of about 700 to 1600° F. to maintain an adequate reaction rate and avoid sintering or aggregation of the iron ore particles which would lead to defluidization of the fluid bed. A preferable temperature range selected from within the foregoing range will depend upon the particular ore selected. For example, a maximum temperature limitation of 1200° F. or lower may be imposed by the tendency of certain ores, for example, a magnetite type ore such as taconite, to agglomerate and cause defluidization of the fluidized bed. Magnetite type ores may be reduced rapidly at relatively low temperatures and 90 percent reduction may be effected in from about 20 to 40 minutes at 1000° F. On the other hand, hematite type iron ores exhibit increased rates of reduction up to temperatures as high as about 1600° F. without defluidization. Some hematite type ores may be ninety percent reduced in as little as ten minutes at a temperature of about 1400° F. Preferable temperature ranges are about 700 to 1200° F. for magnetite type ores and about 1200 to about 1600° F. for hematite type ores. I may employ a reduction time of from about ten minutes to about twelve hours and prefer a time of about one-half to about four hours depending upon the ore, reduction temperature, and degree of reduction desired. The reduction may be conducted advantageously at an elevated pressure in the range of about 50 to 650 p. s. i. g. It is preferred to conduct the reduction at a high enough pressure so that water may be condensed from the effluent at normal cooling water temperatures. For example, the water content of the recycle gas may be readily reduced to less than one volume percent with ordinary cooling water at pressures above about 100 p. s. i. g. and so pressures above 100 p. s. i. g. are preferred. Hydrogen of a minimum purity of 80 percent and preferably at least 90 percent is recycled to the reduction zone. A recycle gas to fresh feed ratio of at least 5 is maintained and preferably a recycle ratio within the range of about 6 to 15 is employed.

All types of oxidic iron ores may be employed in the shift conversion and reduction steps of the process of this invention. High grade Mesabi iron ore containing approximately 8 percent silica is, of course, a preferred charge material, but mill scale containing less than 1 percent silica, and blast furnace flue dust containing about 5 percent silica, are easily handled by the process of the invention. Hematite, limonite and roasted pyrites may also be used as charge material. In general, all iron ores in which the iron is predominantly in the form of oxides are handled by the process of the invention. Preferred charge materials comprise ores of below 15 percent silica content. Although reduction of ore to metallic iron is not hindered by a high silica content, a low silica content in the reduced ore facilitates subsequent separation of metallic iron from slag.

The iron ore employed as catalyst in the water gas shift reaction zone may be employed either in the form of lumps in a fixed bed or a moving bed operation or in the form of fluidizable particles in a fluid bed operation. However, since the subsequent reducing step is conducted in a fluidized bed operation, it is advantageous to comminute the ore to a size suitable for fluidization before the shift conversion step to permit fluidized operation therein. Iron ore particles ranging from about 10 to 3000 microns may be handled by the fluidized solids technique. However, in the hydrogen reduction of iron ore a 25 to 50 percent higher rate of reduction is realized with particles having an average size within the range of about 100 to 3000 microns than with smaller particles having an average particle size within the range between 10 and 100 microns. A particularly surprising and rapid rate of reduction is noticed with ore particles having an average particle size within the range of about 150 to 2500 microns, and accordingly an average particle size within this range is preferred.

When sulfur-containing carbonaceous fuels are employed, for the generation of gas by partial oxidation, the gases produced contain a corresponding amount of hydrogen sulfide. Ordinarily gas containing large quantities of hydrogen sulfide would rapidly deactivate shift conversion catalyst. However, since the catalyst in the process of my invention is continuously replenished, the poisoning effect is inconsequential. The hydrogen sulfide reacts with the iron ore catalyst in the shift conversion zone to form iron sulfide and the effluent hydrogen-containing gas is reduced in sulfur by a corresponding amount. Advantageously, a part of the hydrogen-containing gas of reduced sulfur content may be withdrawn for other uses which require a hydrogen stream of low sulfur content. The presence of iron sulfide in the ore from the shift conversion zone does not interfere with subsequent reduction to metallic iron but does release hydrogen sulfide into the recycle hydrogen stream. The hydrogen sulfide content of the recycle stream may be maintained at a suitable level by scrubbing with a suitable solvent, for example, monoethanolamine if necessary.

An advantage of the process of this invention is that iron ore consumed in the process is employed for shift conversion catalyst making unnecessary the use of expensive synthetic catalysts used heretofore.

Another advantage of the process of this invention is that activity of the shift conversion catalyst is maintained by continuously adding fresh iron ore as catalytic material.

Another advantage of the process of this invention is that the shift conversion process can tolerate carbon monoxide-containing gases containing entrained solids, for example, carbon, by employing fluidized bed operations and thereby avoiding the plugging which would occur in fixed bed operations.

Another advantage of this process is that synthesis gas containing large quantities of impurities which would otherwise poison the shift conversion catalyst may be employed since poisoned catalyst is continuously withdrawn from the shift conversion zone.

Use of the ore feed in the shift conversion zone effects preheating of the ore before it is introduced into the reduction zone thereby effecting economies in heat utilization.

An advantage of the use of partial oxidation with the shift conversion and reduction steps of this process is that hydrogen-rich gas may be generated at a pressure sufficiently high to avoid the necessity of compression before use in the shift conversion and reduction operation. The use of pressure also reduces the size of equipment required and facilitates gas purification processing.

Another advantage of this process is that the high heat content of the gases issuing from the gas generator may be employed to provide the preheat for the gas fed to the shift converter as well as a part of the heat required to generate steam and preheat the ore.

Another advantage is that a by-product stream of hydrogen of low sulfur content may be produced when gasifying sulfur-containing carbonaceous fuels.

The accompanying drawing diagrammatically illustrates one form of the process of this invention. Although the drawing illustrates one arrangement of apparatus in which the process of this invention may be practiced, it is not intended to limit the invention to the particular apparatus or materials described.

Iron ore, from an external source not shown, is introduced into storage bin 1. Ore from bin 1 is sized in grinding rolls 2 and screen 3 to produce fluidizable particles having an average size in the range of about 10 to 3000 microns. Sized ore is collected in bin 4 and is withdrawn as required through standpipe 5. Oxygen, from an external source not shown, in line 7 and fuel, from an external source not shown, in line 8 are reacted in gas generator 9 to form a synthesis gas mixture comprising carbon monoxide and hydrogen. Synthesis gas from generator 9 is discharged through line 10. Steam in line 11, from an external source not shown, passed through line 13 and admixed with the gas in line 10 is preheated as necessary in heater 12. Alternatively or in addition to the steam supplied from an external source, steam may be generated by injecting water through line 14 into the hot generator effluent in line 10.

Ore from standpipe 5 and 5a is entrained by the steam-synthesis gas mixture in line 10 and is transferred through riser 15 and inlet cone 16 into shift converter 17. A fluidized bed of iron ore particles having an interface or bed level indicated by 18 is maintained in converter 17. Iron ore is withdrawn through standpipe 19 to maintain level 18 as desired. Ore from standpipe 19 is entrained in the hydrogen stream in line 20 and is transported through riser 22 and inlet cone 23 into reducer 24. A fluidized bed of iron and iron ore particles is maintained in reducer 24 having a bed level indicated by 25. Particles of iron are withdrawn through standpipe 26 to maintain level 25 as desired. Reduced iron from standpipe 26 is discharged for further processing, such as melting or briquetting, not shown.

Products of the shift conversion reaction are disengaged from the fluidized bed at level 18 and passed through cyclone separator 27, line 28, cooler 29 and water separator 30. Water is withdrawn through line 30b and the separated gas comprising carbon dioxide and hydrogen is withdrawn through line 30a and passed into carbon dioxide scrubber 31. Hydrogen-rich gas substantially free of carbon dioxide is withdrawn through line 32. In reducer 24, hydrogen reacts with the iron oxide ore to form metallic iron and water vapor. Hydrogen and water vapor separate from the fluid bed at level 25 and pass through cyclone separator 33 and line 34 to cooler 35. Effluent from cooler 35 is passed through line 36 to water separator 37 from which liquid water is withdrawn through line 38. Dry hydrogen recycle gas from separator 37 is discharged through line 39 and is recycled by compressor 40 through line 42, heater 43 and lines 44 and 45 to line 20. Build-up of inert gases in the recycle stream is avoided by venting a portion of the recycle gas as necessary through line 47.

In carbon dioxide scrubber 31, the gases therein are contacted with a solvent selective for carbon dioxide, for example, monoethanolamine. Lean solvent is introduced into scrubber 31 through line 47 and rich solvent containing dissolved carbon dioxide is withdrawn through line 48. Rich solvent in line 48 is introduced into stripper 49 where carbon dioxide is separated and discharged through line 50.

Although all of the ore charged to reducer 24 may have been first employed as shift conversion catalyst in converter 17, it is also within the scope of this invention to employ only a part of the feed to the reducer in the shift converter. In the latter case fresh ore is also withdrawn through standpipe 5b and is entrained in recycle hydrogen in line 52 passed through lines 20 and 22 and inlet cone 23 to reducer 24 to comprise a part of the ore charged to the reducer.

By-product hydrogen, for other uses not shown, may be withdrawn from line 32 through line 55 if desired.

Obviously heat economies may be effected by employing heat exchange among several of the process streams. For example, at least a part of the heat required by the recycle hydrogen stream in line 42 may be supplied by employing this gas as at least a part of the cooling medium in either coolers 29 or 35 or both by use of a suitable manifold not shown.

*Example*

Natural gas at a rate of 9.78 million cubic feet per day is preheated to 900° F. and reacted at a pressure of 450 p. s. i. g. and a temperature of 2300° F. with 7.23 million cubic feet per day of 95 percent purity oxygen preheated to 700° F. to produce 30.9 million cubic feet per day of synthesis gas comprising predominantly hydrogen and carbon monoxide in the molal ratio of 1.82.

Water at 100° F. is injected directly into the hot generator gases at the rate of 472,000 lbs. per day, reducing the temperature of the gases to 1200° F. and vaporizing the water into steam at that temperature and at a pressure of 435 p. s. i. g. Superheated steam at a temperature of 1030° F. and a rate of 2,230,000 lbs. per day is added to the 1200° F. gas stream, so that the stream now contains 6 mols of water for each mol of carbon monoxide. This is the ratio required for the subsequent shift conversion step.

This mixture of gas and steam at 435 p. s. i. g. is then used to entrain 2,224 tons per day of a hematite ore containing 50 percent iron by weight. The entrained ore and vapors, now at 800° F. are directed to a shift conversion vessel where the shift conversion reaction is effected.

In the shift converter, the steam reacts with the carbon monoxide to produce one mol each of hydrogen and carbon dioxide for each mol of carbon monoxide reacted. Approximately 97 percent of the carbon monoxide is thus converted to carbon dioxide at a temperature of 800° F. and a pressure of 435 p. s. i. g. The effluent gases from the shift converter in the amount of 86.8 million cubic feet per day and comprising principally hydrogen, carbon dioxide and water are cooled and the condensed water separated. The separated gas is then directed to the carbon dioxide removal unit where the carbon dioxide is absorbed by contacting the gases with monoethanolamine. The effluent gas stream from this scrubber totals 27.75 million cubic feet per day and comprises 95.3 percent hydrogen with small percentages of carbon monoxide, carbon dioxide, methane and nitrogen. This high purity hydrogen stream is used for the subsequent ore reduction.

The ore used as the catalyst in the shift conversion operation is withdrawn from the shift converter at a temperature of 800° F. and a rate of 2,224 tons per day. It is entrained in a stream of hydrogen, comprising a mixture of fresh hydrogen and recycle hydrogen preheated to a temperature of about 1000° F. and totaling 528.3 million cubic feet per day, and directed to the fluidized bed reducing vessel. In the reducer, operated at a temperature of about 850° F. and a pressure of about 400 p. s. i. g., the iron oxide ore is reduced substantially completely to metallic iron by reaction with the hydrogen. Reduced ore at a rate of 1,794 tons per day is withdrawn from the reducer, comprising 1000 tons of metallic iron, 634 tons of gangue and 160 tons of unreduced iron oxide.

Effluent gases from the reducer are cooled and product water condensed and separated. A portion of the resulting hydrogen stream is vented to prevent the build-up of inert gases in the system and the balance of the stream, amounting to 500.5 million cubic feet per day of 82 percent purity hydrogen, is combined with the 27.75 million cubic feet per day of fresh hydrogen to produce the aforementioned 528.3 million cubic feet per day of total hydrogen stream of 82.8 percent purity used to entrain and reduce the iron ore after it leaves the shift converter.

Obviously, many modifications and variations of the invention as hereinbefore set forth may be made without departing from the spirit and scope thereof and, therefore, only such limitations should be imposed as are indicated in the appended claims.

I claim:

1. A process for reducing iron oxide which comprises generating a gas comprising carbon monoxide, contacting at least a part of said iron oxide with said gas comprising carbon monoxide in admixture with steam in a shift conversion zone, effecting reaction of said carbon monoxide and steam in said shift conversion zone to convert at least a part of said carbon monoxide and steam to hydrogen and carbon dioxide, withdrawing gas comprising hydrogen and carbon dioxide from said shift conversion zone, separating said carbon dioxide to produce a hydrogen-rich gas, passing said hydrogen-rich gas to an iron oxide reduction zone, passing iron oxide from said shift conversion zone to said iron oxide reduction zone and effecting reduction of said iron oxide in said reduction zone.

2. A process for reducing iron oxide which comprises contacting said oxide with a gas comprising carbon monoxide and hydrogen in admixture with steam in a shift conversion zone at a temperature within the range of about 600 to about 1000° F. to produce additional quantities of hydrogen and carbon dioxide, withdrawing gas comprising hydrogen and carbon dioxide from said shift conversion zone, separating said carbon dioxide to produce a hydrogen-rich gas which comprises at least 90 percent hydrogen by volume, passing said hydrogen-rich gas to an iron oxide reduction zone, passing iron oxide from said shift conversion zone to said reduction zone to comprise at least a part of the iron oxide charged to said reduction zone and effecting reduction of said iron oxide in said reduction zone at a temperature within the range of about 700 to 1600° F.

3. The process of claim 2 in which said reduction is effected at a pressure within the range of about 50 to 650 p. s. i. g. pressure.

4. The process of claim 2 in which gaseous effluent comprising hydrogen and water vapor is withdrawn from said reduction zone, said gaseous effluent is cooled to condense at least a part of said water vapor, liquid water is separated from uncondensed gas, and said uncondensed gas comprising hydrogen is recycled to said reduction zone.

5. The process of claim 3 in which said shift conversion zone is maintained at a pressure at least as high as said reduction zone.

6. A process for reducing iron oxide which comprises generating a gas comprising carbon monoxide and hydrogen in a gas generation zone by the partial oxidation of a carbonaceous fuel with an oxygen-containing gas at a temperature within the range of about 1800° F. to about 3200° F., contacting said iron oxide with said gas comprising carbon monoxide and hydrogen in admixture with steam in a shift conversion zone at a temperature within the range of about 600 to about 1000° F. to produce additional quantities of hydrogen and carbon dioxide, withdrawing gas comprising hydrogen and carbon dioxide from said shift conversion zone, separating said carbon dioxide to produce a hydrogen-rich gas which comprises at least 90 percent hydrogen by volume, passing said hydrogen-rich gas to an iron oxide reduction zone, passing iron oxide from said shift conversion zone to said reduction zone to comprise at least a part of the iron oxide charged to said reduction zone and effecting reduction of said iron oxide in said reduction zone at a temperature within the range of about 700 to 1600° F.

7. The process of claim 6 in which said gas generation zone, and said shift conversion zone are maintained at a pressure at least as high as said reduction zone.

8. A process for reducing iron oxide which comprises comminuting said iron oxide into particles having an average size within the range of about 100 to 3000 microns contacting said comminuted iron ore particles in a fluidized bed with a gas comprising carbon monoxide and steam at a temperature within the range of about 600 to 1000° F. in a shift conversion zone to produce carbon dioxide and hydrogen, withdrawing gas comprising carbon dioxide and hydrogen from said shift conversion zone, separating said carbon dioxide to produce a hydrogen-rich gas containing at least 90 percent hydrogen by volume, passing said hydrogen-rich gas to an iron oxide reduction zone, passing said particles from said shift conversion zone to said reduction zone to comprise at least a part of the iron oxide charged to said reduction zone, and passing said hydrogen-rich gas through a fluidized bed of said iron oxide particles in said reduction zone at a temperature within the range of about 700 to 1600° F. to effect reduction of said iron oxide.

9. In a process for the reduction of iron oxide in a reduction zone in the presence of a gas comprising hydrogen in which at least a part of said gas is produced by the partial oxidation of a carbonaceous fuel to produce a gas comprising carbon monoxide, said gas comprising carbon monoxide and added steam are contacted with a shift conversion catalyst at shift conversion conditions in a shift conversion zone to convert at least a part of said carbon monoxide to hydrogen and carbon dioxide, and said carbon dioxide is separated therefrom, the improvement which comprises, passing at least a portion of said iron oxide to said shift conversion zone wherein said shift conversion catalyst consists of said iron oxide, and passing said iron oxide from said shift conversion zone to said reduction zone.

References Cited in the file of this patent

UNITED STATES PATENTS

| | | |
|---|---|---|
| 2,479,435 | Vesterdal | Aug. 16, 1949 |
| 2,481,217 | Hemminger | Sept. 6, 1949 |